Patented June 7, 1949

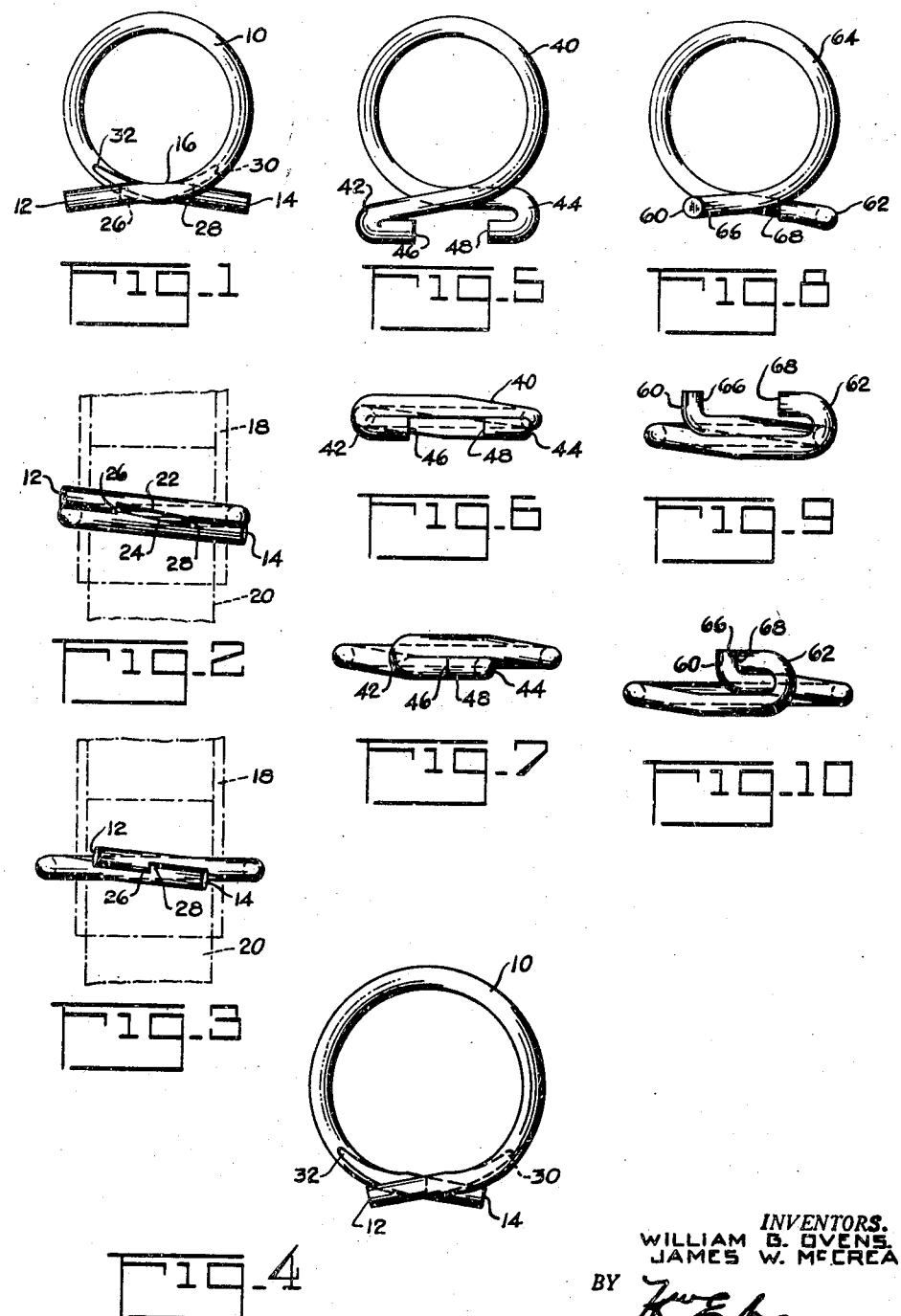

2,472,172

UNITED STATES PATENT OFFICE 2,472,172

HOSE CLAMP

William G. Ovens, Midland Park, and James W. McCrea, Radburn, N. J., assignors to Wright Aeronautical Corporation, a corporation of New York Application September 7, 1945, Serial No. 614,868

3 Claims. (Cl. 24—27)

This invention relates to hose clamps and is particularly directed to a spring type of wire clamp which is adapted to encircle a resilient hose to secure the hose to a tube or the like inserted within the hose.

Specifically, the invention is directed to hose clamps on the general type disclosed in U. S. Patents No. 2,180,271 and No. 2,285,850. Such hose clamps are applied by spreading the clamp with pliers or a similar tool and then releasing the clamp when it is disposed in the desired position over the hose. However, there is a tendency for the installer to open the clamp excessively when applying the clamp in order to facilitate its application. If the clamp is opened excessively, the stress within the clamp may exceed the yield point of its material so that the clamp may take a permanent set increasing the free internal diameter of the clamp thereby reducing its clamping pressure.

It is an object of this invention to provide such a clamp with means for limiting the extent to which the clamp can be opened or spread by pliers or a similar tool when the clamp is being applied. The invention consists in so forming the two ends of the clamp that they abut each other when the clamp is opened to the desired extent.

Other objects of this invention will become apparent upon reading the annexed detailed description in connection with the drawing in which:

Figure 1 is an end view of the clamp;

Figure 2 is a bottom view of Figure 1;

Figures 3 and 4 are views similar to Figures 2 and 1, respectively, but with the clamp opened the maximum extent;

Figures 5, 6 and 7 are views similar to Figures 1, 2 and 3 respectively, but of a further modification; and Figures 8, 9 and 10 are views also similar to Figures 1, 2 and 3 respectively, but of a further modification.

Referring first to Figures 1 to 4, the clamp comprises a single loop or annular portion 10 of preferably round spring wire of proper stiffness. The ends 12 and 14 of the wire comprise straight portions extending substantially tangentially from the loop in opposite directions from the point where the loop is completed. Preferably, the loop portion of the clamp has a slight overlapping circular portion as indicated at 16 to insure clamping pressure 360° about the hose 18. The ends 12 and 14 of the clamp may be engaged and pressed toward each other by pliers or a similar tool thereby spreading or enlarging the clamp loop to enable it to be disposed over a relatively soft and resilient hose 18. When the clamp is released, the elasticity of the clamp tends to return the clamp loop to its original small size thereby clamping the hose 18 about the tube 20 inserted therein. As illustrated, the ends 12 and 14 are straight, but if desired these ends may be bent away from the loop to provide more room for the pliers or other tool used to spread the clamp.

If the clamp loop is spread too far, the clamp wire may crack or at least the stress within the wire will exceed its elastic yield point so that the clamp will take a permanent set. Such a permanent set will increase the free internal diameter of the clamp thereby reducing its clamping pressure about the hose 18. With the construction so far described, it has been found that, in actual practice, it is substantially impossible to prevent the installer or workman from spreading the clamp too far, even when a special tool intended to limit the extent to which the clamp is spread, is provided, apparently because the more the clamp is spread the easier it is to apply.

To prevent excessive spreading of the clamp, the adjacent sides of the straight ends 12 and 14 are provided with notches 22 and 24. The notches 22 and 24 are formed to provide facing surfaces or shoulders 26 and 28 respectively, which engage when the clamp is spread by pliers or a similar tool thereby limiting the extent to which the clamp can readily be so spread as illustrated in Figures 3 and 4. The bottom of the notch 22 tapers outwardly away from its shoulder 26 to merge with the outer surface of the wire at 30. Similarly, the bottom of the notch 24 tapers outwardly away from its shoulder 28 to merge with the outer surface of the wire at 32. Also, the bottom of the notch in each end of the wire has a length sufficient to permit the other wire end to be received therein, thereby permitting the shoulders 26 and 28 to abut each other. Preferably, the wire of the clamp is torsionally twisted so that the ends 12 and 14 press against each other as in a close wound spring. In this way the ends 12 and 14 are urged axially against each other thereby insuring engagement of the shoulders 26 and 28 when the clamp loop is spread.

Referring now to Figures 5 to 7, a modified form of hose clamp is illustrated at 40. The clamp 40 is generally similar to the clamp 10 except that instead of providing notches in the wire ends 42 and 44, these ends are turned back in the plane of the clamp so as to provide alined end faces or surfaces 46 and 48. With this construction, the loop of the clamp can readily be spread or enlarged by pliers or a similar tool only so far as to effect abutting engagement of the end faces or surfaces 46 and 48.

In Figures 8 to 10, the ends 60 and 62 of a hose clamp 64 are turned up out of the plane of the clamp so as to provide facing shoulders or surfaces 66 and 68 which are adapted to abut when the clamp is spread to the desired extent thereby restraining further spreading of the clamp. The clamp 64 is otherwise generally similar to the clamps 10 and 40. Preferably the wire from which the clamp 40 or 64 is formed is also torsionally twisted, like the wire for clamp 10, in a manner so that the ends of the clamps are urged axially toward each other.

In each of the clamps 10, 40 and 64, the ends of the clamps are provided with facing surfaces which are arranged to abut when the clamp is spread to the desired extent thereby limiting the extent to which the clamp can readily be spread by pliers or a similar tool. This construction minimizes the possibility that the installer will overstress the clamp by spreading the clamp too far when he installs it. However, the modification of Figures 1 to 4 is somewhat simpler and more economical than the others in that less wire is required and it is not necessary to bend the ends of the clamp wire as in Figures 5 to 10. Also the ends of the clamp 10, illustrated in Figures 1 to 4, are more suitable for engagement by a tool for spreading the clamp. The notches 22 and 24 in the modification of Figures 1 to 4 can readily be formed before the wire is coiled into a loop.

While we have described our invention in detail in its present preferred embodiment, it will be obvious to those skilled in the art, after understanding our invention, that various changes and modification may be made therein without departing from the spirit or scope thereof. We aim in the appended claims to cover all such modifications and changes.

We claim as our invention:

1. A hose clamp comprising at least one loop of resilient wire with the ends of the loop extending substantially tangentially but oppositely from the point at which said loop is completed, whereby said ends can be pressed toward said point to spread said loop against its elasticity, the adjacent sides of each loop end having a notch providing a shoulder facing a shoulder provided by the notch in the other loop end, the depth of said notches progressively decreasing away from their respective shoulders and said notches having a length sufficient to permit said shoulders to abut each other to limit the extent to which said loop can readily be so spread.

2. A hose clamp comprising at least one loop of resilient wire with straight end portions extending substantially tangentially but oppositely from the point at which said loop is completed, whereby said straight end portions can be pressed toward said point to spread said loop against its elasticity, the adjacent sides of said straight end portions each having a notch providing a shoulder facing a shoulder provided by the notch in the other straight portion and each said notch having a depth gradually decreasing away from its shoulder, said facing shoulders being adapted to abut each other to limit the extent to which said loop can readily be so spread.

3. A hose clamp comprising a single loop of resilient wire with straight end portions, said wire loop being such that in its unstrained condition each straight end portion begins at the point the loop is completed and extends substantially tangentially from said point in a direction opposite to the direction at which the other straight end portion extends from said point, whereby said straight end portions can be pressed toward said point to spread said loop against its elasticity, the adjacent sides of said straight end portions each having a notch providing a shoulder facing a shoulder provided by the notch in the other straight end portion with each said notch having a depth gradually decreasing away from its shoulder, said facing shoulders being adapted to abut each other to limit the extent to which said loop can readily be so spread.

WILLIAM G. OVENS.
JAMES W. McCREA.

REFERENCES CITED

The following references are of record in the file of this patent:

UNITED STATES PATENTS

| Number | Name | Date |
| --- | --- | --- |
| 506,958 | Walden | Oct. 17, 1893 |
| 691,155 | Marsky | Jan. 14, 1902 |
| 1,427,016 | Polhemus | Aug. 22, 1922 |
| 1,796,243 | Coughlin | Mar. 10, 1931 |
| 2,006,358 | Kurkjian | July 2, 1935 |
| 2,081,677 | O'Neill | May 25, 1937 |

FOREIGN PATENTS

| Number | Country | Date |
| --- | --- | --- |
| 10,042 | Great Britain | Apr. 29, 1913 |
| 811,968 | France | Jan. 27, 1937 |